(12) United States Patent
Oka (10) Patent No.: US 7,674,004 B2
(45) Date of Patent: Mar. 9, 2010

(54) PLANAR LIGHT SOURCE DEVICE

(75) Inventor: Masaharu Oka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 123 days.

(21) Appl. No.: 11/641,734

(22) Filed: Dec. 20, 2006

(65) Prior Publication Data
US 2007/0139912 A1 Jun. 21, 2007

(30) Foreign Application Priority Data
Dec. 21, 2005 (JP) ............... 2005-368098

(51) Int. Cl.
*F21V 7/00* (2006.01)
(52) U.S. Cl. ............ 362/217.09; 362/97.1; 362/217.01; 362/217.08; 362/227; 362/249.01; 349/61; 349/62; 349/65; 349/70; 349/71
(58) Field of Classification Search ............... 362/27, 362/33, 97, 217, 223, 224, 260, 227, 249, 362/559–561, 603, 606, 607, 614, 97.1–97.4, 362/217.01, 217.02, 217.05, 217.08, 217.09, 362/249.01; 349/61, 62, 70, 71, 65
See application file for complete search history.

(56) References Cited

U.S. PATENT DOCUMENTS

2003/0234896 A1* 12/2003 Kim ............... 349/65

FOREIGN PATENT DOCUMENTS

| EP | 1 582 913 A1 | 10/2005 |
|---|---|---|
| JP | 56520 U | 1/1993 |
| JP | 2001-194664 A | 7/2001 |
| JP | 2004-071576 | 3/2004 |
| JP | 2004-273396 | 9/2004 |
| JP | 2005-085689 | 3/2005 |

(Continued)

OTHER PUBLICATIONS

Japanese Office Action with English translation, dtd Jun. 24, 2008, in corresponding foreign application, 4 pp.

(Continued)

*Primary Examiner*—Sandra L O'Shea
*Assistant Examiner*—Mary Zettl
(74) *Attorney, Agent, or Firm*—Pillsbury Winthrop Shaw Pittman, LLP (57) ABSTRACT

Cold cathode fluorescent tubes of the first group are aligned widthwise in one side of an enclosure which is divided into two areas at a centerline running widthwise. Cold cathode fluorescent tubes of the second group are aligned widthwise in the other side of the enclosure. All of the cold cathode fluorescent tubes are symmetrically-placed with respect to the centerline running widthwise. The cold cathode fluorescent tubes positioned outside widthwise are inclined at $\theta 2$ so that the distance between each of the tubes and the aperture plane gradually decreases lengthwise from an edge toward the center of the enclosure. The cold cathode fluorescent tubes positioned inside widthwise are inclined at $\theta 1$ so that the distance between each of the tubes and the aperture plane gradually decreases lengthwise from an edge toward the center of the enclosure. The inclined angle $\theta 1$ is made greater than the inclined angle $\theta 2$.

11 Claims, 6 Drawing Sheets

FOREIGN PATENT DOCUMENTS

| | | |
|---|---|---|
| JP | 2005085689 | 3/2005 |
| JP | 2005-150056 | 6/2005 |
| JP | 2005150056 | 6/2005 |
| JP | 2005-195778 | 7/2005 |
| JP | 2005347062 | 12/2005 |
| KR | 2005104193 A * | 11/2005 |

OTHER PUBLICATIONS

Japanese Office Action with English translation, dated Sep. 24, 2008, in corresponding foreign application, 4 pp.

* cited by examiner

PLANAR LIGHT SOURCE DEVICE

CROSS REFERENCE

This Nonprovisional application claims priority under 35 U.S.C. § 119(a) on Patent Application No. 2005-368098 filed in Japan on Dec. 21, 2005, the entire contents of which are hereby incorporated by reference.

BACKGROUND OF THE INVENTION

The present invention relates to planar light source devices used for a backlight unit for a liquid crystal panel, in particular to a planar light source device employing approximately U-shaped cold cathode fluorescent tubes.

Various backlight units employing a cold cathode fluorescent tube have been invented to be used for liquid crystal modules such as liquid crystal televisions.

JP 2005-85689 A discloses a planar light source device of the direct backlight type with approximately U-shaped cold cathode fluorescent tubes arranged parallel to an emission plane. The planar light source device disclosed by JP 2005-85689 A includes the approximately U-shaped lamps in which each of the U-shaped lamps is arranged so that the projection side is positioned parallel to the emission plane.

JP 2004-71576 A discloses a planar light source device provided with a straight cold cathode fluorescent tube oriented along each of widthwise edges of the enclosure. The planar light source device disclosed by JP 2004-71576 A is provided with a backside translucent film for guiding light emitted from the straight cold cathode fluorescent tubes to an emission plane. The backside translucent film is arranged so that the distance between the film and the emission plane gradually decreases as the film stretches from the edges toward the center of the enclosure lengthwise.

JP 2005-195778 A discloses a planar light source device of the direct backlight type provided with straight cold cathode fluorescent tubes arranged parallel to an emission plane. The planar light source device disclosed by JP 2005-195778 A includes cold cathode fluorescent tubes and a chassis. The distance between the tubes and the chassis is greater around the edges of the tubes to which a voltage is applied than around the opposite edges of the tubes.

JP 2005-150056 A discloses a planar light source device of the direct backlight type provided with straight cold cathode fluorescent tubes arranged parallel to an emission plane. The planar light source device disclosed by JP 2005-150056 A includes cold cathode fluorescent tubes which are arranged so that the tubes disposed inside widthwise are positioned closer to the enclosure side, i. e., the side of a reflection plane, than the tubes disposed outside widthwise of the enclosure. The cold cathode fluorescent tubes of JP 2005-150056 A are further arranged so that the distance between the tubes disposed inside widthwise is shorter than the distance between the tubes disposed outside widthwise.

Each of the planar light source devices described above is arranged so as to have a uniform distribution of an irradiation amount on the emission plane. In the meantime, some liquid crystal television devices require higher brightness around the center of the display than around the edges for an improved user-visibility. However, the conventional planar light source devices employing direct-type cold cathode fluorescent tubes have not been able to attain higher brightness around the center of the display widthwise (i. e., in the shorter-side direction) and lengthwise (i. e., in the longer-side direction) at the same time.

The present invention aims to provide a planar light source device of the direct backlight type which achieves a higher brightness around the center of the display than around the edges.

SUMMARY OF THE INVENTION

The present invention provides a planar light source device comprising a plurality of approximately U-shaped light emitters including two straight portions stretching lengthwise from an edge toward a center of an emission plane of an approximately flat enclosure and a curved portion integrating the two straight portions with the curved portion around the center, each of the straight portions including an input-output electrode at one end close to the edge. The approximately U-shaped light emitters are arranged parallel widthwise and symmetrically-placed with respect to a centerline running widthwise on the emission plane. The approximately U-shaped light emitters are inclined such that a distance between the light emitters and the emission plane is made shorter around the center than around the edges. With this arrangement, the distance between the approximately U-shaped light emitters and the emission plane of the planar light source device is made shorter around the center than around the edges of the emission plane. This leads to a greater amount of light reaching the emission plane from the approximately U-shaped light emitters around the center than around the edges. As a result, the emission plane has a higher brightness around the center than around the edges.

DETAILED DESCRIPTION OF THE INVENTION

Referring to the accompanying drawings, a planar light source device according to the first embodiment of the present invention is described below. In this embodiment, a CFL backlight unit used for a liquid crystal module is described as an example of the planar light source device.

Figure 1:
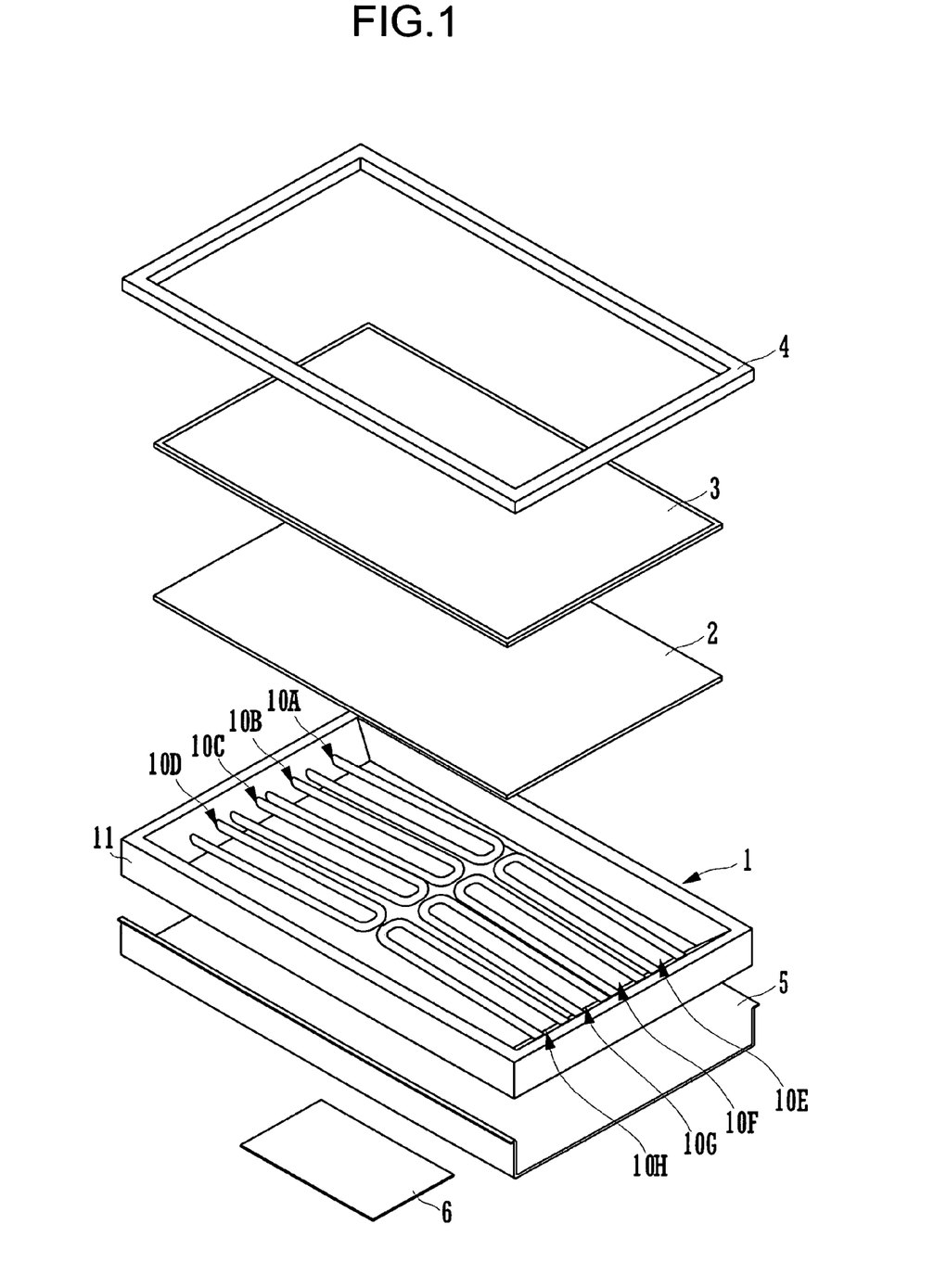
FIG. 1 is an exploded perspective view showing a makeup of the liquid crystal module provided with the CFL backlight unit according to the first embodiment of the invention.

FIG. 1 is an exploded perspective view showing a rough makeup of the liquid crystal module provided with the CFL backlight unit according to the first embodiment of the invention.

As shown in FIG. 1, the liquid crystal module provided with the CFL backlight unit of the present embodiment includes a front frame 4, a liquid crystal panel 3, a diffuser plate 2, a backlight unit 1, a rear frame 5 and a drive circuit board 6, arranged in this order when viewed from the front side (i.e., the user side).

The liquid crystal panel 3 includes a front side glass substrate and a rear side glass substrate, each of the substrates having a predetermined film thickness, and a liquid crystal sandwiched between the front and rear side glass substrates. The glass substrates are sealed at the facing edges to form the liquid crystal panel 3. Each of the front and rear side glass substrates includes electrodes arranged in a predetermined pattern on the side facing the liquid crystal. The electrodes are connected to external electrodes. The external electrodes are connected to a liquid crystal driving IC, and/or other devices. As the liquid crystal driving IC applies varying driving signals to the liquid crystal panel 3, respective dots composing the liquid crystal panel 3 is allowed to transmit or block the light.

The backlight unit 1 is provided with approximately U-shaped cold cathode fluorescent tubes 10A-10H. The tubes 10A-10H are disposed, in a pattern described later, in an enclosure 11 which includes four sidewalls and a bottom plate. The 10A-10H turn on through the application of a driving voltage. The light emitted from the tubes 10A-10H reaches directly to the diffuser plate 2, as well as indirectly through the reflection from the bottom plate of the enclosure 11. Each of the tubes 10A-10H is arranged such that the diffuser plate 2 has higher brightness at the center than at the edges when the same driving voltage is applied to the tubes 10A-10H.

The diffuser plate 2 includes a diffuser sheet or a diffuser panel, and the diffuser plate 2 diffuses incident light from the backlight unit 1 and emits it toward the liquid crystal panel 3. The emitted light is transmitted or blocked on the liquid crystal panel 3 which is controlled by the driving IC. An image pattern to be viewed by a user is formed on the liquid crystal panel 3 based on the transmission or blockage of the emitted light.

A front frame 4 and a rear frame 5 are combined to integrate the liquid crystal panel 3, the diffuser plate 2 and the backlight unit 1.

A drive circuit board 6 receives liquid crystal display control signals from a higher-level device in which the liquid crystal module is installed and sends drive control signals to each of the liquid crystal driving ICs of the liquid crystal panel 3.

Referring now to FIG. 2, the backlight unit 1 of the present invention is described in detail below. Although eight cold cathode fluorescent tubes are used in this embodiment as shown in FIGS. 1 and 2, the number of tubes is suitably determined according to a specification of the device.

FIG. 2 is a plan view, a front cross-sectional view and a cross-sectional view of the CFL backlight unit according to this embodiment. FIG. 2A is a plan view of the backlight unit 1 as viewed from the side facing the diffuser plate 2, i. e., the side of an aperture plane 111. The aperture plane 111 represents an emission plane as described in the claims. FIG. 2B is a front cross-sectional view of the backlight unit 1 with the cold cathode fluorescent tubes 10B, 10C, 10F and 10G sectioned lengthwise. FIG. 2C is a front cross-sectional view of the backlight unit 1 with the tubes 10A, 10D, 10E and 10H sectioned lengthwise. FIG. 2D is a cross-sectional view of the backlight unit 1 with the tubes 10E, 10F, 10G and 10H sectioned widthwise. In the following description, the line running parallel to the shorter sides and passes through approximately the center of the longer sides of the enclosure 11 is referred to as a length centerline, and the line running parallel to the longer sides and passes through approximately the center of the shorter sides is referred to as a width centerline.

As shown in FIG. 2, the backlight unit 1 is a direct type planar light source device provided with the enclosure 11, the approximately U-shaped cold cathode fluorescent tubes 10A-10H and electrode lines 12A-12H and 13A-13D.

The enclosure 11 has an approximately flat box shape in which the height is much shorter than the length and width. The box-shaped enclosure 11 includes four side walls which enclose an aperture plane, and one bottom plate. More specifically, the aperture plane is the area facing the bottom plate and inside a frame formed by top sides of the side walls. A concave portion comprising the side walls and the bottom plate has a mortar-like shape in which the area of the flat bottom is smaller than that of the aperture plane. The inside surface of the bottom plate is processed such that it reflects the light emitted from the tubes 10A-10H. The processing for light reflection includes coloring the surface for a greater reflectance and applying a reflector sheet on the bottom surface.

Figure 2A:
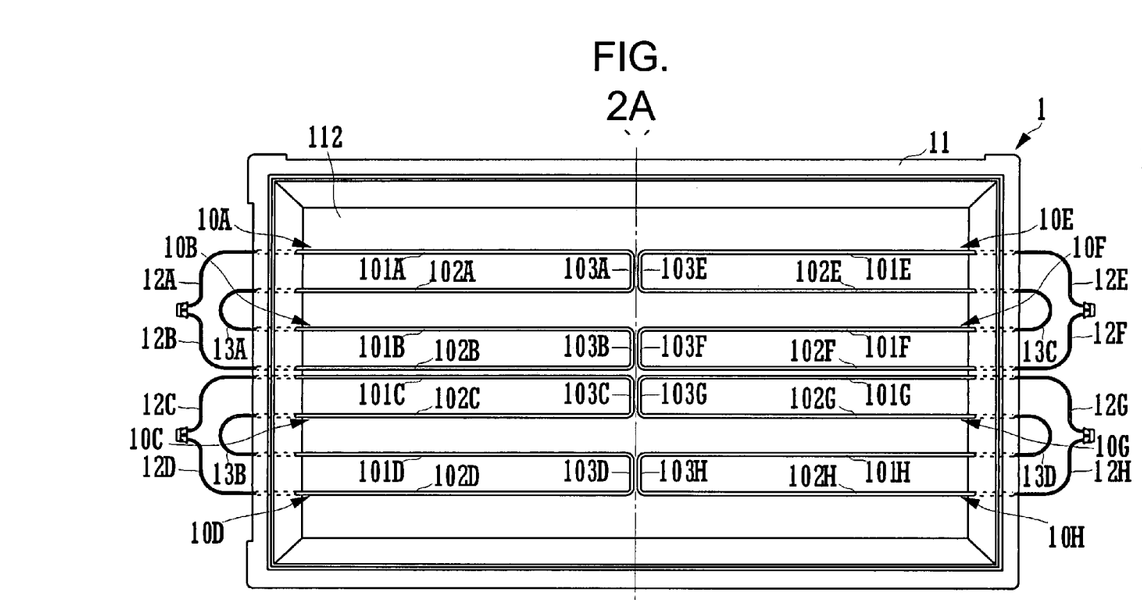
FIGS. 2A, 2B and 2C and 2D are a plan view, front cross-sectional views and a cross-sectional view, respectively, of the CFL backlight unit according to the first embodiment of the invention.

Each of the tubes 10A-10H is composed by integrating a curved portion with two straight portions formed parallel with each other. Each of the tubes 10A-10H has the same structure. For example, the tube 10A includes straight portions 101A and 102A positioned parallel with each other. Each of the straight portions 101A and 102A is connected at one end to a corresponding end of a curved portion 103. The approximately U-shaped tube 10A is composed by integrating the straight portions 101A and 102A with the curved portion, as mentioned above. The approximately U-shaped tube 10A has input-output terminals at both ends thereof, i. e., at the other end of each of the straight portions 101A and 102A.

Each of the input-output terminals of the tubes 10A-10H protrudes outside the enclosure 11 through the shorter side walls. Each of the tubes 10A-10H is arranged in the enclosure 11 such that each of the curved portions 103A-103H is positioned close to the length centerline. The input-output terminal formed at the end of the straight portion 101A of the tube 10A connects to the electrode line 12A, and the one formed at the end of the straight portion 102A to the electrode line 13A. The input-output terminal formed at the end of the straight portion 101B of the tube 10B connects to the electrode line 13A, and the one formed at the end of the straight portion 102B to the electrode line 12B. The electrode lines 12A and 12B connect to a voltage supply for driving the backlight. The input-output terminal formed at the end of the straight portion 101C of the tube 10C connects to the electrode line 12C, and the one formed at the end of the straight portion 102C to the electrode line 13B. The input-output terminal formed at the end of the straight portion 101D of the tube 10D connects to the electrode line 13B, and the one formed at the end of the straight portion 102D to the electrode line 12D. The electrode lines 12C and 12D connect to a voltage supply for driving the backlight. The input-output terminal formed at the end of the straight portion 101E of the tube 10E connects to the electrode line 12E, and the one formed at the end of the straight portion 102E to the electrode line 13C. The input-output terminal formed at the end of the straight portion 101F of the tube 10F connects to the electrode line 13C, and the one formed at the end of the straight portion 102F to the electrode line 12F. The electrode lines 12E and 12F connect to a voltage supply for driving the backlight. The input-output terminal formed at the end of the straight portion 101G of the tube 10G connects to the electrode line 12G, and the one formed at the end of the straight portion 102G to the electrode line 13D. The input-output terminal formed at the end of the straight portion 101H of the tube 10H connects to the electrode line 13D, and the one formed at the end of the straight portion 102H to the electrode line 12H. The electrode lines 12G and 12H connect to a voltage supply for driving the backlight.

The cold cathode fluorescent tubes 10A-10D are positioned on one side of the concave portion of the enclosure 11 (i. e., on the left side as viewed from the aperture plane 111) which is divided into two areas at the length centerline. The tubes 10A-10D are arranged such that they form U-shapes when viewed from the aperture plane 111, as well as the bottom surface 112. The tubes 10A-10D are arranged widthwise in alphabetical order.

The cold cathode fluorescent tubes 10E-10H are positioned on the other side of the concave portion of the enclosure 11 (i. e., on the right side as viewed from the aperture plane 111). The tubes 10E-10H are arranged such that they form U-shapes when viewed from the aperture plane 111, as well as the bottom surface 112. The tubes 10E-10H are arranged widthwise in alphabetical order. The tubes 10A and 10E are symmetrically-placed with respect to the length centerline. The tubes 10B and 10F are symmetrically-placed with respect to the length centerline. The tubes 10C and 10G are symmetrically-placed with respect to the length centerline. The tubes 10D and 10H are symmetrically-placed with respect to the length centerline.

Figure 2B:
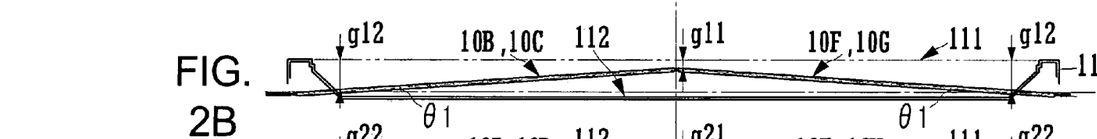

AS the straight portions 101B, C, F and G and 102B, C, F and G of the tubes 10B, 10C, 10F and 10G are inclined at a predetermined angle $\theta 1$ with respect to the aperture plane 111 as well as the bottom surface 112, the distance between the tubes 10B, 10C, 10F and 10G and the aperture plane 111 is made smaller at the curved portions 103B, C, F and G than at the areas close to the input-output terminals. Accordingly, the distance between the surface of each of the tubes 10B, 10C, 10F and 10G and the aperture plane 111 is g11 at the curved portions 103 B, C, F and G respectively, i. e., around the length centerline of the enclosure 11, and g12 which is greater than g11 (g12>g11) at the areas close to the input-output terminals, i. e., around the both ends of the enclosure 11 lengthwise.

Figure 2C:
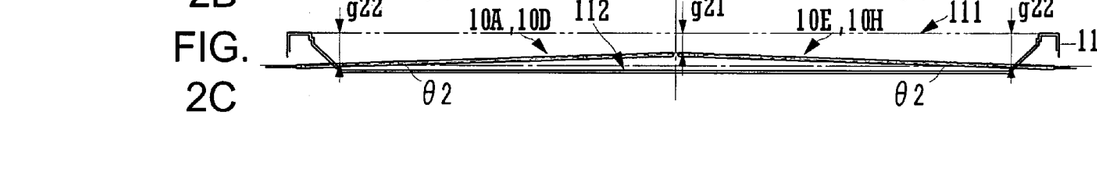
Figure 2D:
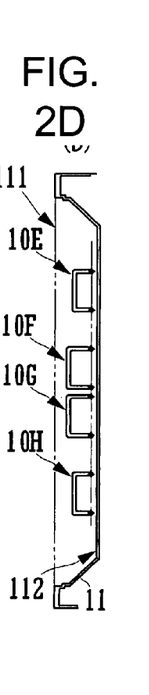

The straight portions 101A, D, E and H and 102A, D, E and H of the tubes 10A, 10D, 10E and 10H are inclined at a predetermined angle $\theta 2$ with respect to the aperture plane 111 as well as the bottom surface 112 so that the distance between the tubes 10A, 10D, 10E and 10H and the aperture plane 111 is made smaller at the curved portions 103A, D, E and H than at the areas close to the input-output terminals. Accordingly, the distance between the surface of each of the tubes 10A, 10D, 10E and 10H and the aperture plane 111 is g21 at the curved portions 103A, D, E and H respectively, i. e., around the length centerline of the enclosure 11, and g22 which is greater than g21 (g22>g21) at the areas close to the input-output terminals, i. e., around the both ends of the enclosure 11 lengthwise.

With the above described arrangement, the distance between each of the tubes 10A-10H and the aperture plane 111 is made shorter around the length centerline of the enclosure 11 than around the both ends of the enclosure 11 lengthwise. This allows the backlight unit 1 to have a higher brightness around the central portion than around the both ends lengthwise.

Further, as shown in FIG. 2, the inclined angle $\theta 1$ at the tubes 10B, 10C, 10F and 10G which are disposed close to the center widthwise is greater than the inclined angle $\theta 2$ at the tubes 10A, 10D, 10E and 10H which are disposed close to the edges widthwise. With the above arrangement, the distance between each of the curved portions 103B, 103C, 103F and 103G of the tubes 10B, 10C, 10F and 10G and the aperture plane 111 is made shorter than the distance between each of the curved portions 103A, 103D, 103E and 103H of the tubes 103A, 103D, 103E and 103H and the aperture plane 111. This allows the backlight unit 1 to have a higher brightness at the central portion than at the both ends widthwise as well as lengthwise.

In other words, these arrangements allow the direct type back light unit 1 to have a higher brightness around the central portion than around the edges when viewed at right angle with the aperture plane 111.

The ratio between the inclined angle $\theta 0$ and $\theta 2$ may arbitrarily be determined according to the specification for the brightness distribution necessary for the device. This allows achieving a diversified brightness distribution, while at the same time remaining higher brightness around the central portion than around the portions close to the edges.

Now, referring to FIG. 3, a planar light source device according to the second embodiment of the present invention is described below. As the planar light source device of this embodiment comprises the same components as the planar light source device of the first embodiment, only the differences with the planar light source device of the first embodiment are described in this embodiment.

Figures 3A, 3B:
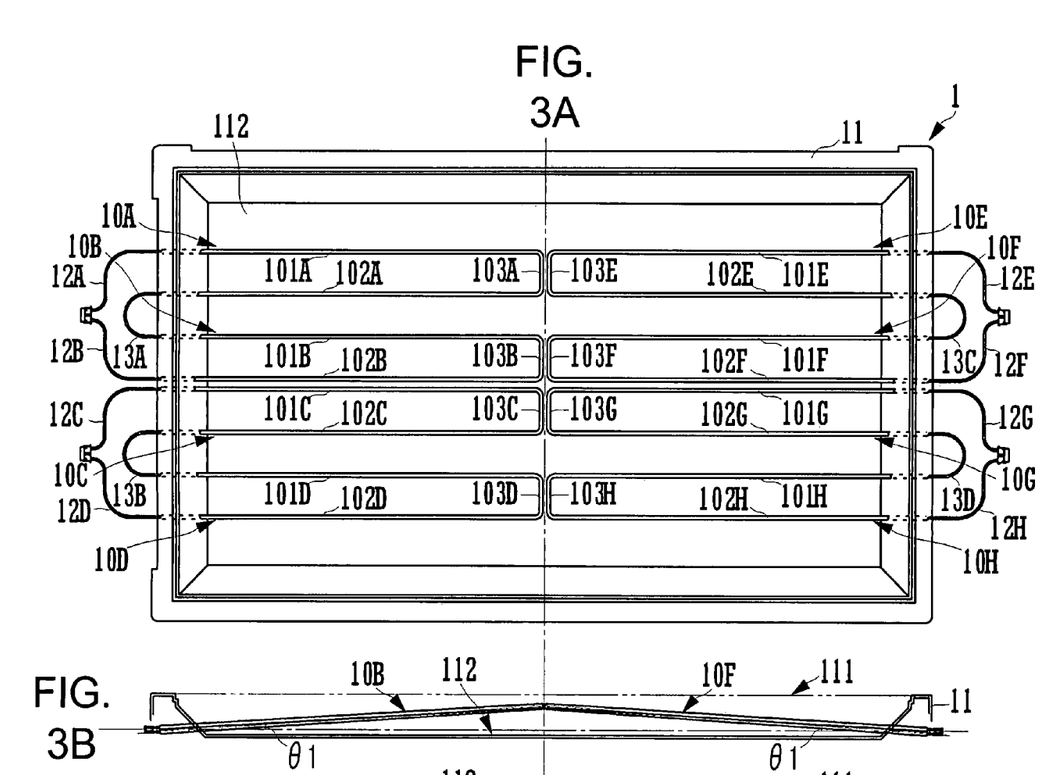
FIGS. 3A, 3B and 3C and 3D are a plan view, front cross-sectional views and a cross-sectional view, respectively, of the CFL backlight unit according to the second embodiment of the invention.
Figure 3C:
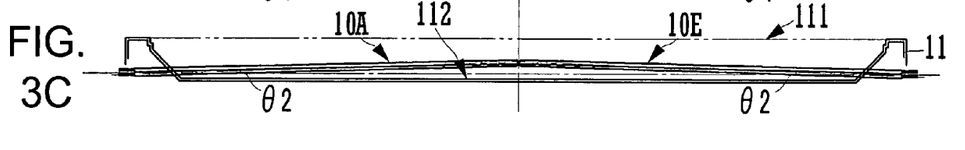
Figure 3D:
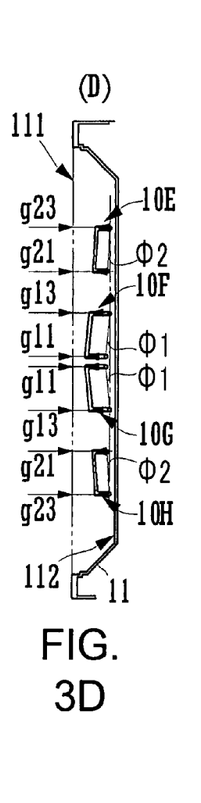

FIG. 3 is a plan view, a front cross-sectional view and a cross-sectional view of the CFL backlight unit according to the second embodiment of the invention. FIG. 3A is a plan view of the backlight unit 1 as viewed from the side facing the diffuser plate 2, i.e., the side of an aperture plane 111. FIG. 3B is a front cross-sectional view of the backlight unit 1 with the cold cathode fluorescent tubes 10B and 10F sectioned lengthwise. FIG. 3C is a front cross-sectional view of the backlight unit 1 with the cold cathode fluorescent tubes 10A and 10E sectioned lengthwise. FIG. 3D is a cross-sectional view of the backlight unit 1 with the cold cathode fluorescent tubes 10E, 10F, 10G and 10H sectioned widthwise. In the following description, the line running parallel to the shorter sides and passes through approximately the center of the longer sides of the enclosure 11 is referred to as a length centerline, and the line running parallel to the longer sides and passes through approximately the center of the shorter sides is referred to as a width centerline.

In the CFL backlight unit as shown in FIG. 3, the cold cathode fluorescent tubes 10A-10H are arranged and connected in the same manner as those in FIG. 2. Similarly, the inclined angle made by respective tubes 10A-10H and the aperture plane 111 as well as the reflection plane 112 (hereinafter referred to as a lengthwise inclined angle) is the same as that in FIG. 2.

Each of the cold cathode fluorescent tubes 10A-10H according to this embodiment is arranged so as to have a widthwise inclined angle (i. e., an inclined angle made by a line running through the two straight portions and the aperture plane 111 as well as the reflection plane 112) in addition to the lengthwise inclined angle. For example, the tube 10E is inclined at $\phi 2$ so as to arrange the inner straight portion 102E to be disposed closer to the aperture plane 111 than the outer straight portion 101E. More specifically, the tube 10E is arranged so that a line running vertically between the central axes of the straight portions 101E and 102E is inclined at $\phi 2$ with respect to the aperture plane 111 and the reflection plane 112. In the same way, the tube 10F is inclined at $\phi 1$ so as to arrange the inner straight portion 102F to be disposed closer to the aperture plane 111 than the outer straight portion 101F. The tube 10G is inclined at $\phi 1$ so as to arrange the inner straight portion 101G to be disposed closer to the aperture plane 111 than the outer straight portion 102G. The tube 10H is inclined at φ2 so as to arrange the inner straight portion 101H to be disposed closer to the aperture plane 111 than the outer straight portion 102H. With the arrangement described above, the tubes 10E and 10H are symmetrically-placed with respect to the width centerline of the enclosure 11. Similarly, the tubes 10F and 10G are symmetrically-placed with respect to the width centerline of the enclosure 11. In each of the cold cathode fluorescent tubes 10E-10H, the inner portion is positioned closer to the aperture plane 111 than the outer portion. More specifically, in the tube 10E, the distance g21 between the inner straight portion 102E and the aperture plane 111 is shorter than the distance g23 between the outer straight portion 101E and the aperture plane 111. Similarly, in the tube 10F, the distance g11 between the inner straight portion 102F and the aperture plane 111 is shorter than the distance g13 between the outer straight portion 101F and the aperture plane 111. In addition, by setting the inclined angle φ1 to be greater than the inclined angle φ2, the distance g11 between the inner straight portion 102F of the tube 10F and the aperture plane 111 is made shorter than the distance g21 between the inner straight portion 102E of the tube 10E and the aperture plane 111. By adjusting the inclined angles θ1 and θ2, the outer straight portion 101F of the tube 10F is positioned slightly closer to the aperture plane 111 than the inner straight portion 102E of the tube 10E. Similarly, the outer straight portion 102G of the tube 10G is positioned slightly closer to the aperture plane 111 than the inner straight portion 101H of the tube 10H. With the above arrangements, an unevenness of brightness along the widthwise direction is reduced.

Although not shown in detail, the tubes 10A and 10E are symmetrically-placed with respect to the length centerline of the enclosure 11. Similarly, the tubes 10B and 10F are symmetrically-placed with respect to the length centerline of the enclosure 11. The tubes 10C and 10G are symmetrically-placed with respect to the length centerline of the enclosure 11. The tubes 10D and 10H are symmetrically-placed with respect to the length centerline of the enclosure 11. With the above arrangement, similarly to the cold cathode fluorescent tubes 10E-10H, the distance between each of the outer tubes 10A and 10D and the aperture plane 111 is made shorter than the distance between each of the inner tubes 10B and 10C and the aperture plane 111.

This makes the distance between each of the cold cathode fluorescent tubes and the aperture plane 111 gradually vary from the most outer tube to the central tube. This allows more detailed setting to have a higher brightness around the central portion than around the edges.

Now, referring to FIG. 4, a planar light source device according to the third embodiment is described below. As the planar light source device of this embodiment comprises the same components as the planar light source device of the first and second embodiments, only the differences with the planar light source device of the second embodiment are described in this embodiment.

Figure 4A:
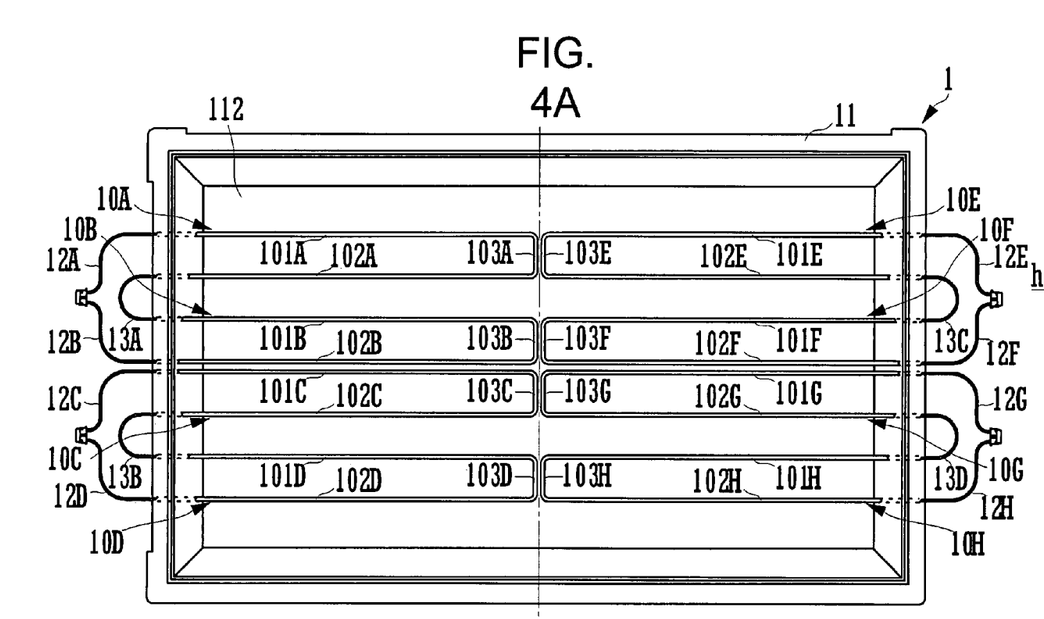
FIGS. 4A, 4B and 4C and 4D are a plan view, front cross-sectional views and a cross-sectional view, respectively, of the CFL backlight unit according to the third embodiment of the invention.
Figures 4B, 4C:
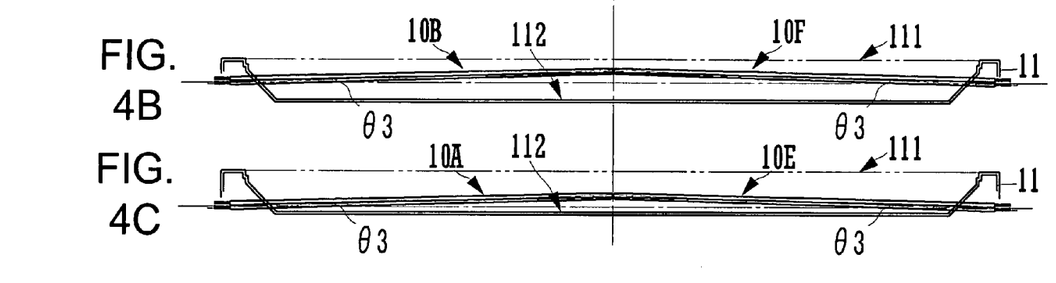
Figure 4D:
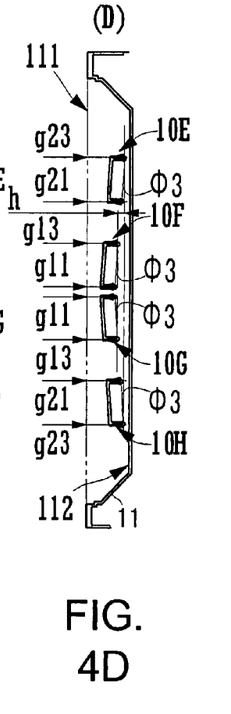

FIG. 4 is a plan view, a front cross-sectional view and a cross-sectional view of the CFL backlight unit according to the third embodiment of the invention. FIG. 4A is a plan view of the backlight unit 1 as viewed from the side facing the diffuser plate 2, i.e., the side of an aperture plane 111. FIG. 4B is a front cross-sectional view of the backlight unit 1 with the cold cathode fluorescent tubes 10B and 10F sectioned lengthwise. FIG. 4C is a front cross-sectional view of the backlight unit 1 with the cold cathode fluorescent tubes 10A and 10E sectioned lengthwise. FIG. 4D is a cross-sectional view of the backlight unit 1 with the cold cathode fluorescent tubes 10E, 10F, 10G and 10H sectioned widthwise. In the following description, the line running parallel to the shorter sides and passes through approximately the center of the longer sides of the enclosure 11 is referred to as a length centerline, and the line running parallel to the longer sides and passes through approximately the center of the shorter sides is referred to as a width centerline. Similarly to the CFL backlight unit of the second embodiment, each of the cold cathode fluorescent tubes 10A-10H according to this embodiment is arranged so as to have a widthwise inclined angle in addition to a lengthwise inclined angle, as shown in FIG. 4D. In this embodiment, a widthwise inclined angle of φ3 and a lengthwise inclined angle θ3 are applied to each of the tubes 10A-10H. Further, the distance between each of the inner tubes 10B, 11C, 10F and 10G and the aperture plane 111 is shorter than the distance between each of the outer tubes 10A, 10D, 10E and 10H and the aperture plane 111, in the present embodiment.

As shown in FIG. 4D, the tube 10F is disposed closer to the aperture plane 111 by height h than the tube 10E, and the tube 10G is disposed closer to the aperture plane 111 by height h than the tube 10H, for example. More specifically, the height h is set so as to dispose the outer straight portions 101F and 102G of the tubes 10F and 10G, respectively, higher than the inner straight portions 102E and 101H of the tubes 10E and 10H, respectively, heightwise in the enclosure 11. Although not shown in FIG. 4, similarly to the second embodiment, the cold cathode fluorescent tubes 10A-10D and the corresponding tubes 10E-10H are symmetrically-placed with respect to the length centerline, and have the same structure with each other.

This arrangement allows a smoother variation of the distances between the tubes and the aperture plane 111 in the widthwise direction, whereby facilitating a more detailed brightness distribution in which the degree of brightness is higher around the center than around the edges.

Although, in the description of this embodiment, the widthwise inclined angle of φ3 and a lengthwise inclined angle θ3 are applied to each of the tubes 10A-10H, each of the inclined angles may be varied according to the specifications of the device.

Now, referring to FIG. 5, a planar light source device according to the forth embodiment is described below. As the planar light source device of this embodiment comprises the same components as the planar light source device of the first, second and third embodiments, only the differences with the planar light source device of the first embodiment are described in this embodiment.

Figures 5A, 5B:
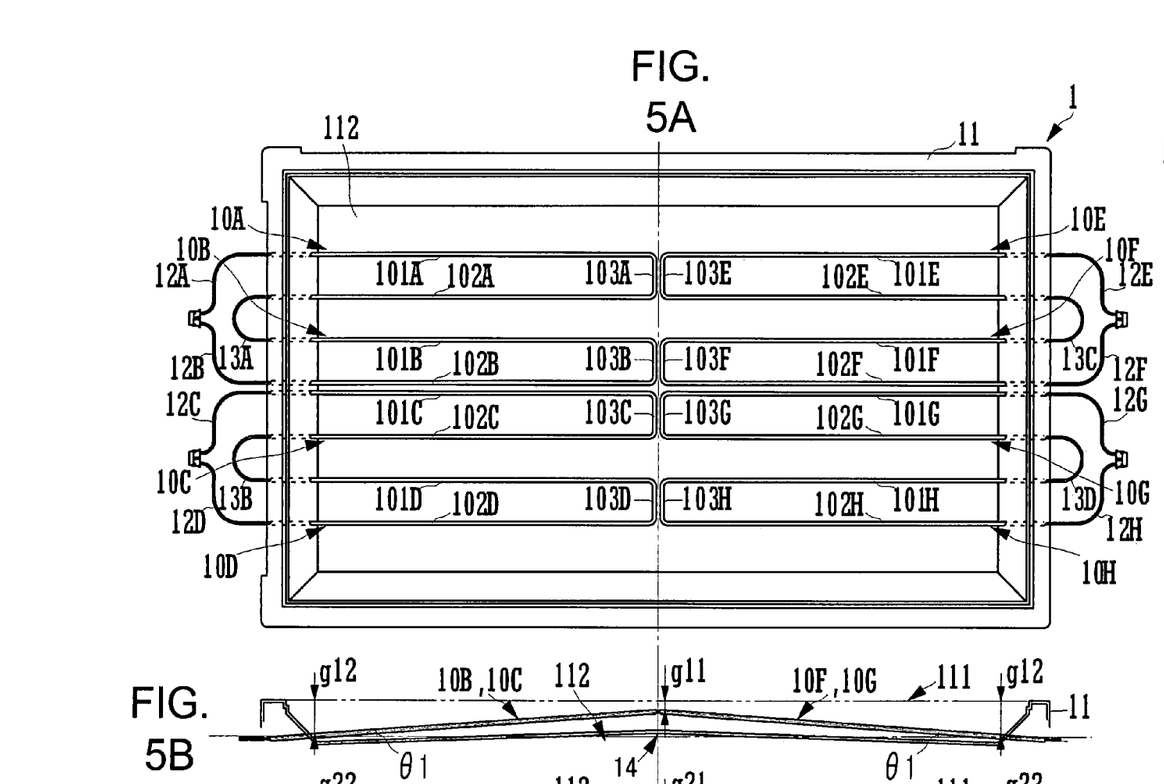
FIGS. 5A, 5B and 5C and 5D are a plan view, front cross-sectional views and a cross-sectional view, respectively, of the CFL backlight unit according to the fourth embodiment of the invention.
Figure 5C:
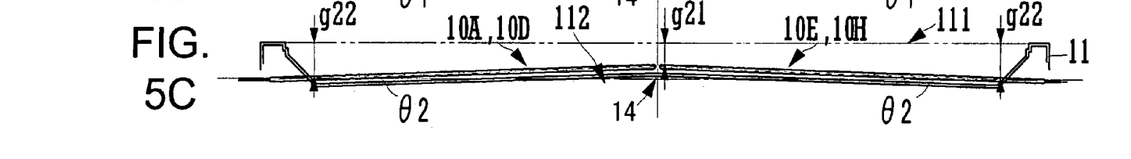
Figure 5D:
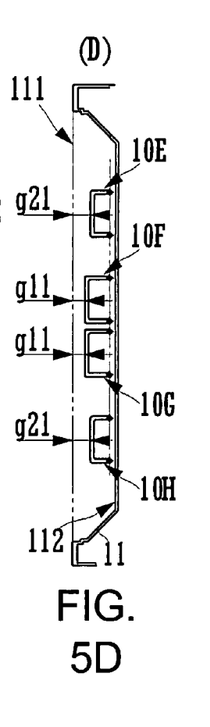

FIG. 5 is a plan view, a front cross-sectional view and a cross-sectional view of the CFL backlight unit according to the forth embodiment of the invention. FIG. 5A is a plan view of the backlight unit 1 as viewed from the side facing the diffuser plate 2, i.e., the side of an aperture plane 111. FIG. 5B is a front cross-sectional view of the backlight unit 1 with the cold cathode fluorescent tubes 10B and 10F sectioned lengthwise. FIG. 5C is a front cross-sectional view of the backlight unit 1 with the cold cathode fluorescent tubes 10A and 10E sectioned lengthwise. FIG. 5D is a cross-sectional view of the backlight unit 1 with the cold cathode fluorescent tubes 10E, 10F, 10G and 10H sectioned widthwise. In the following description, the line running parallel to the shorter sides and passes through approximately the center of the longer sides of the enclosure 11 is referred to as a length centerline, and the line running parallel to the longer sides and passes through approximately the center of the shorter sides is referred to as a width centerline. The CFL backlight unit according to the present embodiment includes an enclosure 11 in which a bottom plate is bent heightwise along the length. More specifically, the bottom plate has a bend 14 so that the distance between the bottom plate and the aperture plane 111 decreases as the bottom plate stretches toward the center along the length. The bend 14 is formed according to the above described inclined angles θ1 and θ2 in the lengthwise direction. This arrangement provides a uniform distance between each of the tubes 10A-10H and the bottom plate (i.e., the reflection plane 112). As a result, the amount of reflected light may be increased around the central portion lengthwise, providing a higher brightness around the central portion.

Now, referring to FIG. 6, a planar light source device according to the fifth embodiment is described below. As the planar light source device of this embodiment comprises the same components as the planar light source device of the third embodiment, only the differences with the planar light source device of the third and forth embodiments are described in this embodiment.

Figures 6A, 6B:
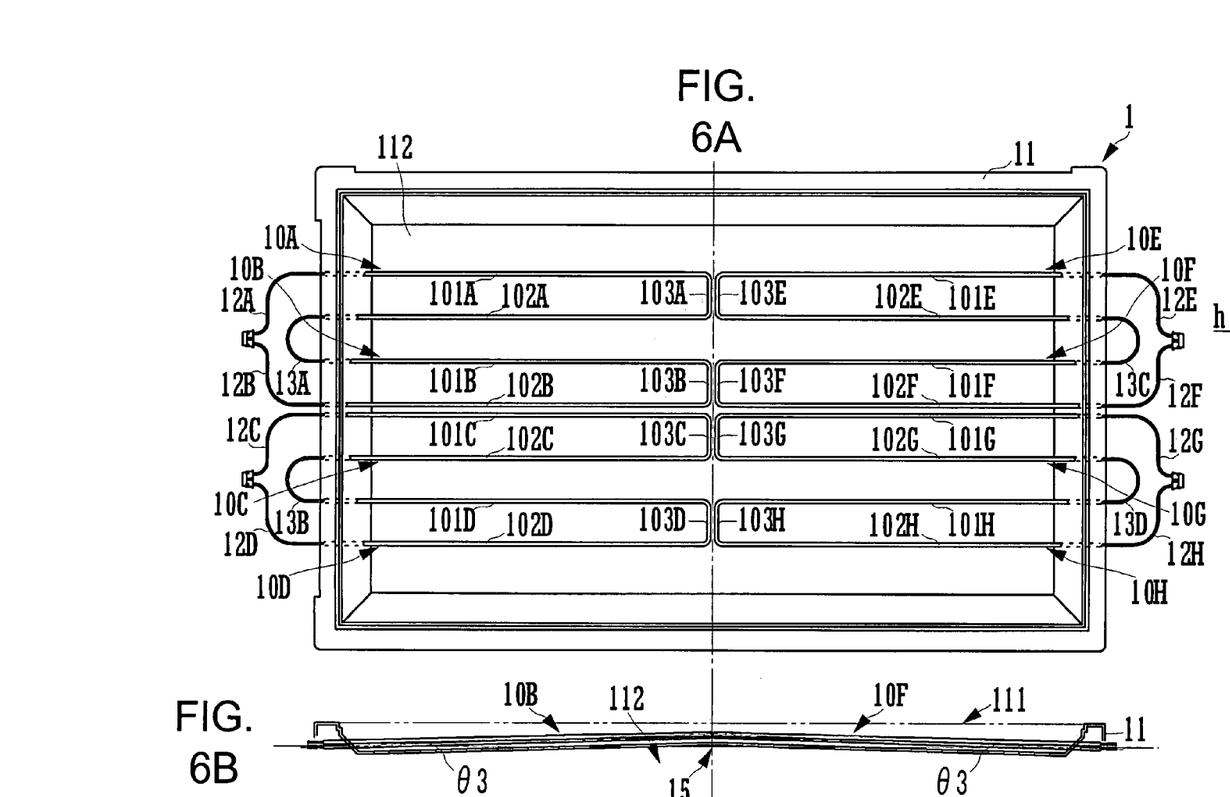
FIGS. 6A, 6B and 6C and 6D are a plan view, front cross-sectional views and a cross-sectional view, respectively, of the CFL backlight unit according to the fifth embodiment of the invention.
Figure 6C:
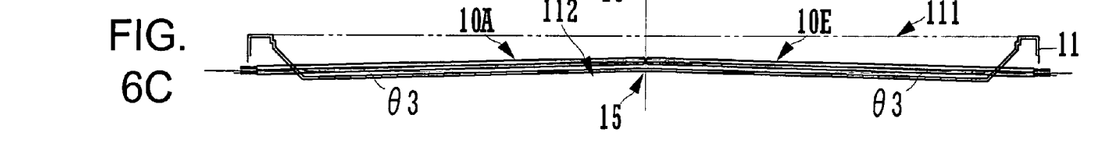
Figure 6D:
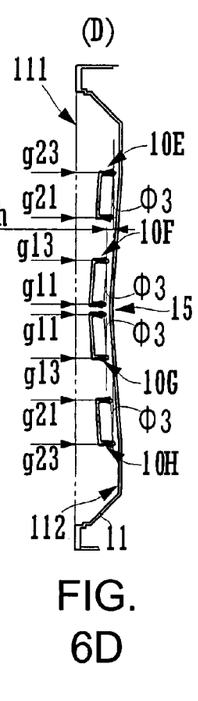

FIG. 6 is a plan view, a front cross-sectional view and a cross-sectional view of the CFL backlight unit according to the fifth embodiment of the invention. FIG. 6A is a plan view of the backlight unit 1 as viewed from the side facing the diffuser plate 2, i.e., the side of an aperture plane 111. FIG. 6B is a front cross-sectional view of the backlight unit 1 with the cold cathode fluorescent tubes 10B and 10F sectioned lengthwise. FIG. 6C is a front cross-sectional view of the backlight unit 1 with the cold cathode fluorescent tubes 10A and 10E sectioned lengthwise. FIG. 6D is a cross-sectional view of the backlight unit 1 with the cold cathode fluorescent tubes 10E, 10F, 10G and 10H sectioned widthwise. In the following description, the line running parallel to the shorter sides and passes through approximately the center of the longer sides of the enclosure 11 is referred to as a length centerline, and the line running parallel to the longer sides and passes through approximately the center of the shorter sides is referred to as a width centerline.

The CFL backlight unit according to the present embodiment includes an enclosure 11 in which a bottom plate is bent heightwise along the width as well as the length. More specifically, the bottom plate has a bend 15 so that the distance between the bottom plate and the aperture plane 111 decreases as it stretches from the edges to the middle when viewed at right angle with the bottom plate. The bend 15 is formed according to the lengthwise inclined angle θ3 and the widthwise inclined angle φ3. This arrangement allows the distance between each of the tubes 10A-10H and the bottom plate (i.e., the reflection plane 112) to be further uniformed. As a result, the amount of reflected light may be further increased around the central portion lengthwise as well as widthwise, providing a much higher brightness around the central portion.

Although the inclined angles θ2, θ3, φ2, and φ3 are applied to the outer tubes 10A, 10D, 10E and 10H respectively, in each of the embodiments described above, these tubes may be installed without having inclined angles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. The planar light source device, comprising,
a plurality of approximately U-shaped light emitters, each of the approximately U-shaped light emitters including two straight portions stretching lengthwise from an edge toward a center of an emission plane of an approximately flat enclosure and a curved portion integrating the two straight portions therewith around the center of the enclosure, each of the straight portions including an end, close to the edge, provided with an input-output electrode,
wherein the approximately U-shaped light emitters are arranged parallel widthwise, symmetrically-placed with respect to a lengthwise centerline, and each of the approximately U-shaped light emitters is inclined such that a distance between the emission plane and an edge of the straight portions around the curved portion is made shorter than a distance between the emission plane and the straight portions around edges of the enclosure,
wherein the approximately U-shaped light emitters are inclined such that a distance between the two straight portions and emission plane is made shorter around the curved portions than around the input-output electrodes,
wherein the approximately U-shaped light emitters positioned inside widthwise are applied a greater inclined angle than the approximately U-shaped light emitters positioned outside widthwise.

2. The planar light source device according to claim 1,
wherein each of the approximately U-shaped light emitters includes an inner straight portion disposed inside widthwise and an outer straight portion disposed outside of the inner straight portion, the inner straight portion being located closer to the emission plane than the outer straight portion.

3. The planar light source device according to claim 2,
wherein the approximately U-shaped light emitters positioned inside widthwise are located closer to the emission plane than the light emitters positioned outside.

4. The planar light source device according to claim 2, further comprising a reflection plane in the enclosure,
wherein the reflection plane is shaped such that the distance between the reflection plane and the emission plane is made shorter around the center than around the edges of the enclosure according to an arrangement of the approximately U-shaped light emitters.

5. The planar light source device according to claim 3, further comprising a reflection plane in the enclosure,
wherein the reflection plane is shaped such that the distance between the reflection plane and the emission plane is made shorter around the center than around the edges of the enclosure according to an arrangement of the approximately U-shaped light emitters.

6. The planar light source device according to claim 1,
wherein the approximately U-shaped light emitters positioned inside widthwise are located closer to the emission plane than the light emitters positioned outside.

7. The planar light source device according to claim 1, further comprising a reflection plane in the enclosure,
wherein the reflection plane is shaped such that the distance between the reflection plane and the emission plane is made shorter around the center than around the edges of the enclosure according to an arrangement of the approximately U-shaped light emitters.

8. The planar light source device, comprising,
a plurality of approximately U-shaped light emitters, each of the approximately U-shaped light emitters including two straight portions stretching lengthwise from an edge toward a center of an emission plane of an approximately flat enclosure and a curved portion integrating the two straight portions therewith around the center of the enclosure, each of the straight portions including an end, close to the edge, provided with an input-output electrode,
wherein the approximately U-shaped light emitters are arranged parallel widthwise, symmetrically-placed with respect to a lengthwise centerline, and each of the approximately U-shaped light emitters is inclined such that a distance between the emission plane and an edge of the straight portions around the curved portion is made shorter than a distance between the emission plane and the straight portions around edges of the enclosure, wherein the approximately U-shaped light emitters are inclined such that a distance between the two straight portions and emission plane is made shorter around the curved portions than around the input-output electrodes, wherein each of the approximately U-shaped light emitters includes an inner straight portion disposed inside widthwise and an outer straight portion disposed outside of the inner straight portion, the inner straight portion being located closer to the emission plane than the outer straight portion.

9. The planar light source device according to claim 8, wherein the approximately U-shaped light emitters positioned inside widthwise are located closer to the emission plane than the light emitters positioned outside.

10. The planar light source device according to claim 8, further comprising a reflection plane in the enclosure, wherein the reflection plane is shaped such that the distance between the reflection plane and the emission plane is made shorter around the center than around the edges of the enclosure according to an arrangement of the approximately U-shaped light emitters.

11. The planar light source device, comprising, a plurality of approximately U-shaped light emitters, each of the approximately U-shaped light emitters including two straight portions stretching lengthwise from an edge toward a center of an emission plane of an approximately flat enclosure and a curved portion integrating the two straight portions therewith around the center of the enclosure, each of the straight portions including an end, close to the edge, provided with an input-output electrode, wherein the approximately U-shaped light emitters are arranged parallel widthwise, symmetrically-placed with respect to a lengthwise centerline, and each of the approximately U-shaped light emitters is inclined such that a distance between the emission plane and an edge of the straight portions around the curved portion is made shorter than a distance between the emission plane and the straight portions around edges of the enclosure, wherein the approximately U-shaped light emitters are inclined such that a distance between the two straight portions and emission plane is made shorter around the curved portions than around the input-output electrodes, wherein the approximately U-shaped light emitters positioned inside widthwise are located closer to the emission plane than the light emitters positioned outside.

* * * * *